June 19, 1945.  F. W. COFFING  2,378,836

MOTOR VEHICLE AND JACK LIFTING CONNECTION

Filed Jan. 22, 1944

INVENTOR.
FREDRICK W. COFFING.
BY
Lockwood, Goldsmith & Galt
ATTORNEYS.

Patented June 19, 1945

2,378,836

UNITED STATES PATENT OFFICE 2,378,836

MOTOR VEHICLE AND JACK LIFTING CONNECTION

Fredrick W. Coffing, Danville, Ill.

Application January 22, 1944, Serial No. 519,309

5 Claims. (Cl. 254—133)

This invention relates to a motor vehicle and jack lifting connection.

This application is a continuation-in-part of the copending application Serial No. 502,551, filed September 16, 1943, and entitled "Motor vehicle and jack lifting connection."

The basic problem is fully considered in said application, made a part hereof. The invention disclosed therein solved all present model car problems but one.

The present invention solves that problem.

In extreme late model automobiles, the rear fenders are of such shape that the wheel opening has an upper edge normally appreciably below the upper edge or surface of the tire. In other words, a rear tire in such instances, cannot be axially removed without lowering the wheel and axle a sufficient amount relative to the frame and chassis so that axial removal of the tire can be effected.

For tire removal, of course, it is necessary to elevate the tire and wheel from the ground a sufficient distance to remove the load from the wheel. These two conflicting requirements, as it were, constitute the aforesaid problem.

The chief object of the present invention is to provide a connection between a vehicle and a jack so that the vehicle portion to be affected is lifted bodily the requisite amount for tire-ground clearance and the tire in question is lowered relative to the fender a sufficient amount for tire-fender clearance whereby the tire can be axially removed, etc.

The chief feature of the present invention resides in the lifting connection between the vehicle and jack, whereby the aforesaid objective is accomplished.

Other features will be set forth more fully hereinafter.

The full nature of the invention will be understood from the accompanying drawing and the following description and claims:

In the drawing

Fig. 1 is a top plan view of the rear end of a vehicle chassis, the rear fenders being omitted, and with the vehicle supported portion of the invention applied thereto.

Fig. 2 is a side elevation of same with the lifting jack attached, the parts being shown in normal position prior to operation, the fender being shown dotted.

Fig. 3 is an enlarged perspective view of one of the simplest forms of the jack connectible end of the vehicle supported portion of the lifting connection.

Fig. 4 is a diagrammatic view, comparable to Fig. 2, showing another application of the basic invention to a vehicle having a different rear axle body spring from that shown in Figs. 1 and 2.

In Fig. 1 of the drawing 10 indicates the rear part of the frame, 11 the rear axle structure connected thereto by springs 12 and mounting driving and load supporting wheels 13. The front end of each spring is pivoted to the frame as at 12a. The rear end of each spring is connected to the frame by shackle links 12b.

Extending from and secured to the rear end of frame 10 are the arms 14 of a bumper structure having bumper portion 15 and splash shield 16. A cable or other relatively inextensible but flexible means 22 is shown passed through the shackle links 12b and the intermediate portion 23 lies beneath spring 12 adjacent said link connection.

One end 21 of the cable terminates adjacent but slightly spaced from the bumper 15. The other end adjacent thereto is doubled upon itself to form a loop or ring 26. A "Crosby" clip clamp 24, see Fig. 3, may secure both ends and a third portion 25 of the cable 22 together. A comparatively light spring 27 is secured at one end to the bumper 15 at 28, while its opposite end is suitably secured to the loop 26, although it may also be secured to the "Crosby" clip.

This light spring permits normal relative movement between spring 12 and frame, but always maintains the cable 22 taut.

A bumper jack has a base 29, a standard or upright 30 and an elevating member 31 operable by portion 31c. Member 31 includes the usual bumper engaging portion 31a. This is a conventional jack. For purposes of the present invention, portion 31a may be omitted. Secured to member 31 as at 31b is a chain 32, which is flexible but inextensible. The other end of the chain terminates in a hook 33.

When a rear tire is to be changed the jack is positioned either as shown in Fig. 2 of said copending application, or such that upright 30 bears against bumper 15. In this instance, chain 32 may be offset from the support 30 sufficient for such contact. When positioned as aforesaid (either one) hook 33 is engaged in loop 26 of the cable 22.

Elevation of member 31 then bodily elevates the adjacent side of the vehicle including the wheel, etc. However, such elevation simultaneously loads the spring 12, but not to the degree the body load did, so that while the body load is carried by cable 22 and the shackle links and frame, the shackles impose upon spring 12, since it is anchored at its other end, a load sufficient to prevent normal separation between frame and axle when normal load is removed therefrom. This imposed load results in a "straightening" of the spring as it were.

The foregoing dual action results in first bodily elevation of the vehicle and tire sufficient for tire-ground clearance purposes and also results in lowering of the axle, wheel and tire relative to the frame, but same is restricted and is relatively not unlimited, as occurs when the bumper portion 31 of the jack is applied directly to bumper 15 and member 31 is elevated. The foregoing restricted lowering is at least sufficient to provide tire clearance relative to the fender opening so that the tire can be removed axially without fender interference.

This invention has the advantages that the vehicle need not be elevated sufficient to effect tire and ground clearance and tire and fender clearance necessary when the spring 12 assumes an unloaded position as is the case when portion 31b is hooked under bumper 15 for conventional jack elevating operation to effect such clearances. When the non-extensible cable 22 and the jack chain 32 are connected together in the manner described and are under tension due to operation of the lifting jack, continuous tension lifting means are established between the said jack lifting element and the vehicle spring and running gear.

Other methods or means of anchoring cable 22 to the shackle end of the spring 21 and other methods or means may be used or provided, respectively, at the other end of said cable as will be obvious to skilled mechanics.

Reference will now be had to Fig. 4 wherein a second type of rear axle body spring is diagrammatically illustrated. In said Fig. 4, 40 indicates the frame, 41 the rear axle alignment brace pivoted thereto and connected at diverging downwardly and rearwardly ends 42 to the axle housing 43. Interposed between each end of the axle housing and frame is a coil spring 44. The rear end of the frame has rigidly secured thereto arms 45 of a bumper structure including bumper portion 46 and shield 47.

The vehicle carried portion of the connection includes cable 48 connected to axle housing 43 near the end thereof as at 49. The other end of cable 48 may include ring 50. A light spring 51 is connected at 53 to the ring. Various forms of connections at 49 and ring 50 may be employed as previously mentioned.

The jack structure shown in Fig. 2 is similarly applied, that is upright 30 may bear against bumper 46 and hook 33 may be engaged in loop or ring 50. Elevation of member 31 of the jack raises the vehicle for tire-ground clearance and simultaneously partially unloads spring 44, so that only partial lowering of axle 43 occurs and in an amount at least sufficient for tire-fender clearance, but not to the extent resulting when the jack is applied directly to the bumper now in conventional practice. Specifically as the frame is elevated when the jack is operated, spring 44 tends to elongate. However, cable 48 prevents excessive elongation because the rear axle alignment brace 41 limits fore and aft axle movement, but permits up and down movement thereof.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. Lifting means for vehicles having a rectangular frame member including a side and an end portion and a wheel support yieldably connected with said frame member; a flexible non-extensible cable connected at one end to said wheel support and extending toward and terminating inwardly of said end portion of said frame, a removable jack disposed beyond said frame end portion, a lifting member forming a part of said jack disposed above the plane of the lowermost part of said frame end portion, a flexible element connected to and depending from said lifting member outside of said frame end portion, and readily releasable means for connecting said flexible element to said opposite end of the cable beneath said frame end; the non-extensible cable and said flexible element when operatively connected together and under lifting stress of said jack constituting continuous tension to maintain said frame member and wheel support against separating movement as well as lifting means operating upon the lower edge of said end frame member to elevate said vehicle.

2. Lifting means for vehicles having a rectangular frame member including a side and end portion, an axle member and a spring parallel with and operatively connected between said side frame portion and said axle member; a flexible non-extensible cable connected at one end to an end of said spring and extending towards and having its opposite end terminating adjacent to and inwardly of said frame end portion, a removable jack disposed beyond said frame end portion, a lifting member forming a part of said jack disposed above the plane of the lowermost part of said frame end portion, a flexible element connected to and depending from said lifting member outside of said frame end portion, said flexible element adapted to pass beneath and in engagement with said frame end portion, and readily releasable means for connecting said flexible element to said opposite end of the cable beneath said frame end; the non-extensible cable and said flexible element when operatively connected together and under lifting stress of said jack constituting continuous tension to maintain said frame and axle members against separating movement as well as lifting means operating upon the lower edge of said end frame member to elevate said vehicle.

3. Lifting means for vehicles having a rectangular frame member including a side and an end portion, an axle member, a spring parallel with said side frame portion and connected intermediate its ends to said axle member, and a shackle connecting an end of said spring with said side frame member; a flexible non-extensible cable connected at one end to said spring through said shackle and extending towards and having its opposite end terminating adjacent to and inwardly of said end portion, a spring connecting said cable end yieldably with said frame end portions, a removable jack disposed beyond said frame end portion, a lifting member forming a part of said jack disposed above the plane of the lowermost part of said frame end portion, a flexible element connected to and depending from said lifting member outside of said frame end portion, and readily releasable means for connecting said flexible element to said opposite end of the cable beneath said frame end; the non-extensible cable and said flexible element when operatively connected together and under lifting stress of said jack constituting continuous tension to maintain said frame and axle members against separating movement as well as lifting means operating upon the lower edge of said end frame member to elevate said vehicle.

4. Lifting means for vehicles having a rectangular frame member including a side and an end portion, an axle member, and springs operatively connected between said frame member and said axle member; a flexible non-extensible cable connected at one end to said axle member and extending toward and having its opposite end terminating inwardly of said end portion of said frame, a removable jack disposed beyond said frame end portion, a lifting member forming a part of said jack disposed above the plane of the lowermost part of said frame end portion, a flexible element connected to and depending from said lifting member outside of said frame end portion, and readily releasable means for connecting said flexible element to said opposite end of the cable beneath said frame end; the non-extensible cable and said flexible element when operatively connected together and under lifting stress of said jack constituting continuous tension to maintain said frame and axle members against separating movement as well as lifting means operating upon the lower edge of said end frame member to elevate said vehicle.

5. Lifting means for vehicles having a rectangular frame member including a side and an end portion, an axle member, a spring parallel with said side frame portion and connected intermediate its ends to said axle member, and a shackle connecting an end of said spring with said side frame member; a flexible non-extensible cable connected at one end to said shackle and extending towards and having its opposite end terminating adjacent to said end portion, a removable jack disposed beyond said end frame portion, a lifting member forming a part of said jack disposed above the plane of the lowermost part of said end frame portion, a flexible element connected to and depending from said lifting member, and means for connecting said non-extensible cable with said flexible element; the non-extensible cable and said flexible element when operatively connected together and under lifting stress of said jack constituting continuous tension to maintain said frame and axle members against separating movement as well as lifting means operating upon the lower edge of said end frame member to elevate said vehicle.

FREDRICK W. COFFING.